(12) United States Patent
Zirwas et al.

(10) Patent No.: US 12,063,558 B2
(45) Date of Patent: Aug. 13, 2024

(54) EARLY DATA TRANSMISSION FOR DUAL CONNECTIVITY OR CARRIER AGGREGATION

(71) Applicant: Nokia Technologies Oy, Espoo (FI)

(72) Inventors: Wolfgang Zirwas, Munich (DE); Mikko Säily, Laukkoski (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 373 days.

(21) Appl. No.: 17/622,030

(22) PCT Filed: Jun. 28, 2019

(86) PCT No.: PCT/US2019/039983
§ 371 (c)(1),
(2) Date: Dec. 22, 2021

(87) PCT Pub. No.: WO2020/263283
PCT Pub. Date: Dec. 30, 2020

(65) Prior Publication Data
US 2022/0279395 A1    Sep. 1, 2022

(51) Int. Cl.
*H04W 36/00* (2009.01)
*H04W 36/08* (2009.01)
*H04W 74/0833* (2024.01)

(52) U.S. Cl.
CPC ... *H04W 36/0069* (2018.08); *H04W 36/0016* (2013.01); *H04W 36/08* (2013.01); *H04W 74/0833* (2013.01)

(58) Field of Classification Search
None
See application file for complete search history.

(56) References Cited

U.S. PATENT DOCUMENTS

| 9,900,923 B2 | 2/2018 | Damnjanovic et al. |
| 2014/0192740 A1 | 7/2014 | Ekpenyong et al. |
| 2015/0271811 A1 | 9/2015 | Kim et al. |
| 2015/0365872 A1 | 12/2015 | Dudda et al. |

(Continued)

FOREIGN PATENT DOCUMENTS

| CA | 3088486 A1 | 5/2019 |
| CN | 104247303 A | 12/2014 |

(Continued)

OTHER PUBLICATIONS

Office Action received for corresponding Indian Patent Application No. 202247004144, dated Jun. 9, 2022, 5 pages.

(Continued)

*Primary Examiner* — Saad Khawar
(74) *Attorney, Agent, or Firm* — Barta Jones, PLLC

(57) ABSTRACT

An example method, apparatus, and computer-readable storage medium are provided for early data transmission (EDT) random access (RA) procedure for dual connectivity or carrier aggregation. In an example implementation, the method may include receiving configuration information from a network node, initiating an early data transmission (EDT) random access (RA) procedure with one or more cells indicated in the configuration information, determining a secondary cell of the one or more cells as a preferred secondary cell, and transmitting data to the preferred secondary cell.

20 Claims, 7 Drawing Sheets

(56) References Cited

U.S. PATENT DOCUMENTS

| | | | |
|---|---|---|---|
| 2018/0103385 A1 | 4/2018 | Zhu et al. | |
| 2018/0324869 A1 | 11/2018 | Phuyal et al. | |
| 2019/0159197 A1* | 5/2019 | Shrestha | H04W 72/21 |
| 2019/0159257 A1 | 5/2019 | Rico Alvarino et al. | |
| 2022/0124585 A1* | 4/2022 | Wang | H04W 36/023 |

FOREIGN PATENT DOCUMENTS

| | | |
|---|---|---|
| WO | 2013/117239 A1 | 8/2013 |
| WO | 2014/092411 A1 | 6/2014 |
| WO | 2018/174577 A1 | 9/2018 |
| WO | 2018/201621 A1 | 11/2018 |
| WO | 2019/031427 A1 | 2/2019 |

OTHER PUBLICATIONS

"New WID on Enhancing CA Utilization", 3GPP TSG RAN Meeting #75, RP-170805, Agenda: 10.1.2, Nokia, Mar. 6-9, 2017, 4 pages.

"WID on Multi-RAT Dual-Connectivity and Carrier Aggregation enhancements (LTE_NR_DC_CA_enh-Core)", 3GPP TSG-RAN#81, RP-182076, Agenda: 9.2.2, Ericsson, Sep. 10-13, 2018, 5 pages.

Osseiran et al., "IOT and machine-Type communication", IEEE Communications Standards Magazine, vol. 3, No. 2, Jun. 2019, pp. 44-44.

Hoglund et al., "3GPP Release 15 Early Data Transmission", IEEE Communications Standards Magazine, vol. 2, No. 2, Jun. 2018, pp. 90-96.

International Search Report and Written Opinion received for corresponding Patent Cooperation Treaty Application No. PCT/US2019/039983, dated Sep. 11, 2019, 9 pages.

Office action received for corresponding Chinese Patent Application No. 201980097915 X, dated Jan. 19, 2024, 6 pages of office action and no page of translation available.

"Introduction of EDT for eMTC and NB-IoT enhancements in TS 36.300", 3GPP TSG-RAN2 Meeting #102, R2-1807880, Huawei, May 21-25, 2018, 12 pages.

Extended European Search Report received for corresponding European Patent Application No. 19934607.3, dated Jan. 4, 2023, 9 pages.

"RACH Configuration for NR", 3GPP TSG-RAN WG2#NR AdHoc#2, R2-1706685, Agenda: 10.3.1.4.1, InterDigital Inc, Jun. 27-29, 2017, pp. 1-3.

Office action received for corresponding Indonesian Patent Application No. P00202111602 dated Mar. 8, 2024, 3 pages of office action and 3 pages of translation available.

* cited by examiner

EARLY DATA TRANSMISSION FOR DUAL CONNECTIVITY OR CARRIER AGGREGATION

RELATED APPLICATION

This application claims priority to PCT Application No. PCT/US2019/039983 filed on Jun. 28, 2019, the contents of which are incorporated herein by reference in their entirety.

TECHNICAL FIELD

This description relates to wireless communications, and in particular, to configuration of dual connectivity (DC) or carrier aggregation (CA).

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

An example method, apparatus, and computer-readable storage medium are provided for early data transmission (EDT) random access (RA) procedure for dual connectivity or carrier aggregation. In an example implementation, the method may include receiving configuration information from a network node, initiating an early data transmission (EDT) random access (RA) procedure with one or more cells indicated in the configuration information, determining a secondary cell of the one or more cells as a preferred secondary cell, and transmitting data to the preferred secondary cell.

DETAILED DESCRIPTION

Figure 1:
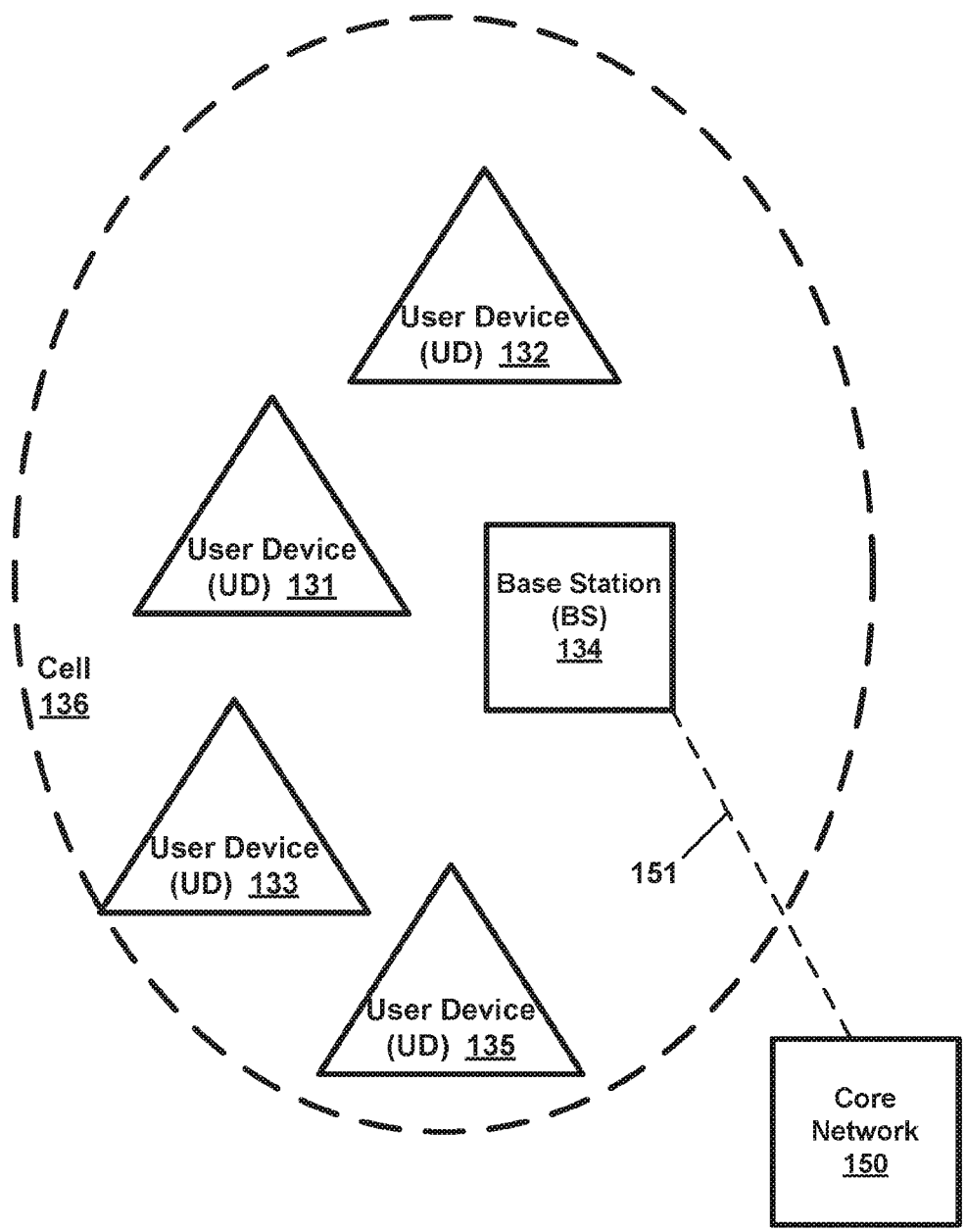
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples. Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

Dual Connectivity (DC) can significantly improve user throughput and mobility robustness by allowing a user equipment (UE) to be simultaneously connected to two cells, for example, a cell of a master cell group (MCG) and a cell of a secondary cell group (SCG). Carrier Aggregation (CA) allows combining a plurality of carriers to support higher peak data rates and overall capacity of wireless networks. The cells in CA, for example, Primary Cell (PCell) and Secondary Cells (SCells)) are in same gNB/eNB.

DC/CA (also referred to as DCCA in the present disclosure) in inter-site deployment requires the network (e.g., gNB/eNB) to have knowledge of candidate cells (e.g., candidate secondary cells, SCells). This can be achieved based on UE measurements of candidate SCells. But, the drawback is that the UE measurements consume time and/or resources (e.g., measurement resources/occasions, UE battery power, etc.). Therefore, there is a need/desire for fast(er) configuration and/or activation of SCells for DC and/or CA at a UE.

Similar scenarios could be envisioned in the context of multi-connectivity or other forms of dual connectivity/carrier aggregation, e.g., multi-radio access technology-dual connectivity (MR-DC), New Radio-New Radio (NR-NR) DC, for 5G and beyond.

Figure 2:
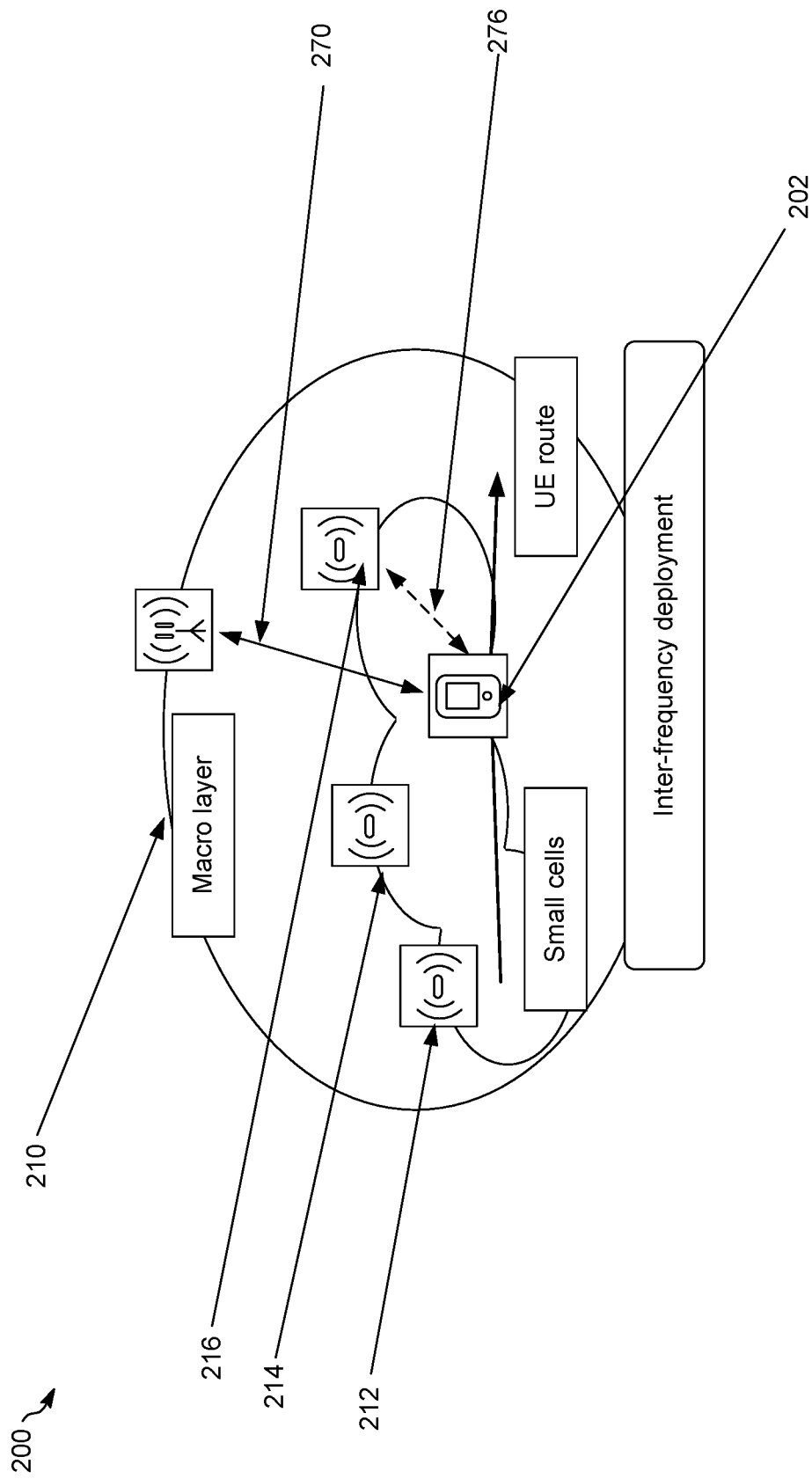
FIG. 2 illustrates an inter-frequency deployment scenario, according to at least an example implementation.

FIG. 2 illustrates an inter-frequency deployment scenario 200, according to at least an example implementation.

In FIG. 2, a UE 202, a macro cell 210 (e.g., macro layer) and three cells (e.g., cells 212, 214, and 216) are shown as an example. The cells 212, 214, and/or 216 may be any type of cell, e.g., macro cell, small cell, pico cell, etc., or any combination thereof. In one example implementation, UE 202 may receive 270 configuration information from macro cell 210, perform measurements (e.g., inter-frequency measurements such as RSRP, RSRQ, etc.) of the small cells indicated in the configuration information, determine the best cell (e.g., optimal cell) for connection based on the UE measurements, and connect 276 to the best cell 216. The measurements may be reference signal received power (RSRP), reference signal received quality (RSRQ), etc. However, the above described process is not efficient as it involves UE performing measurements which take time and use resources.

In some implementations, for example, the proposed disclosure may include receiving configuration information from a network node, initiating early data transmission (EDT) random access (RA) procedure with one or more small cells indicated in the configuration information, determining a small cell from the one or more small cells as a preferred secondary cell, and transmitting data to the preferred secondary cell.

Random access (RA) procedure is used by UEs to synchronize with the network (e.g., cells). In some implementations, RA procedure may be a four-step RA procedure or a two-step RC procedure depending on configuration.

In an example implementation, the four-step RACH procedure may include Messages 1, 2, 3, and/or 4 (referred to as Msg1, Msg2, Msg3, and Msg4) exchanged between a UE and a network element/base station (e.g., eNB, gNB) as following: a) Step 1—Msg1—UE selects one of the 64 available RACH preambles and sends it to a gNB, for example, using a random access radio network temporary identity (RA-RNTI) as an identifier; b) Step 2—Msg2—gNB sends Random Access Response (RAR) to the UE on a downlink shared channel (DL-SCH) addressed to the RA-RNTI calculated from the timeslot in which the preamble was sent. In some implementations, the Msg2 may include the following information: Temporary cell-RNTI (C-RNTI)—gNB gives another identity to UE which is called temporary C-RNTI (cell radio network temporary identity) for further communication; Timing Advance Value: gNB informs UE to change its timing so it can compensate for the round trip delay caused by UE distance from the gNB; and Uplink Grant Resource: gNB will assign initial resource to UE so that it can use UL-SCH (Uplink shared channel); c) Step 3—Msg3—Using UL-SCH, UE sends RRC connection request message to gNB. UE is identified by temporary C-RNTI (assigned previously by gNB). In some implementations, Msg. 3 may include following—UE identity (TMSI or Random Value)—The TMSI is used if the UE has previously connected to the same network. With TMSI value, the UE is identified in the core network; Random value is used if UE is connecting for the very first time to network. The random value or TMSI are needed as the Temporary-CRNTI may have assigned to more than one UEs previously, due to multiple requests coming at same time; and Connection establishment cause: This shows the reason why the UE needs to connect to network; d) Step 4—Msg4—gNB responds with contention resolution message to the UE whose message was successfully received in Step 3. This message is addressed towards TMSI value or Random number (from previous steps) but may include the new C-RNTI which may be used for the further communication.

In an example implementation, the two-step RA procedure may include two messages, Messages A and B (referred to as MsgA and MsgB respectively). In some implementations, in the two-step RACH procedure, MsgA may include Msg. 1 (preamble signal) and Msg3 (data signal) of the four-step RACH procedure and MsgB may include Msg2 (random access response) and Msg4 (contention resolution) of the four-step RACH procedure.

Early data transmission (EDT) procedure (also referred to as EDT in the present disclosure) piggy backs user data to one of the first connection setup messages (for example, Msg3/MsgA for uplink and Msg4/MsgB for downlink) in a random access procedure.

In an example implementation, the techniques described in the present disclosure achieve fast(er) configuration and/or activation of secondary cells for DC/CA (DCCA) without the UE performing any inter-frequency measurements. The absence of such inter-frequency measurements improve battery life of the UE and/or reduces the use of measurement resources/occasions for performing inter-frequency measurements, and thus improves user throughput and/or lowers latencies.

Figure 3:
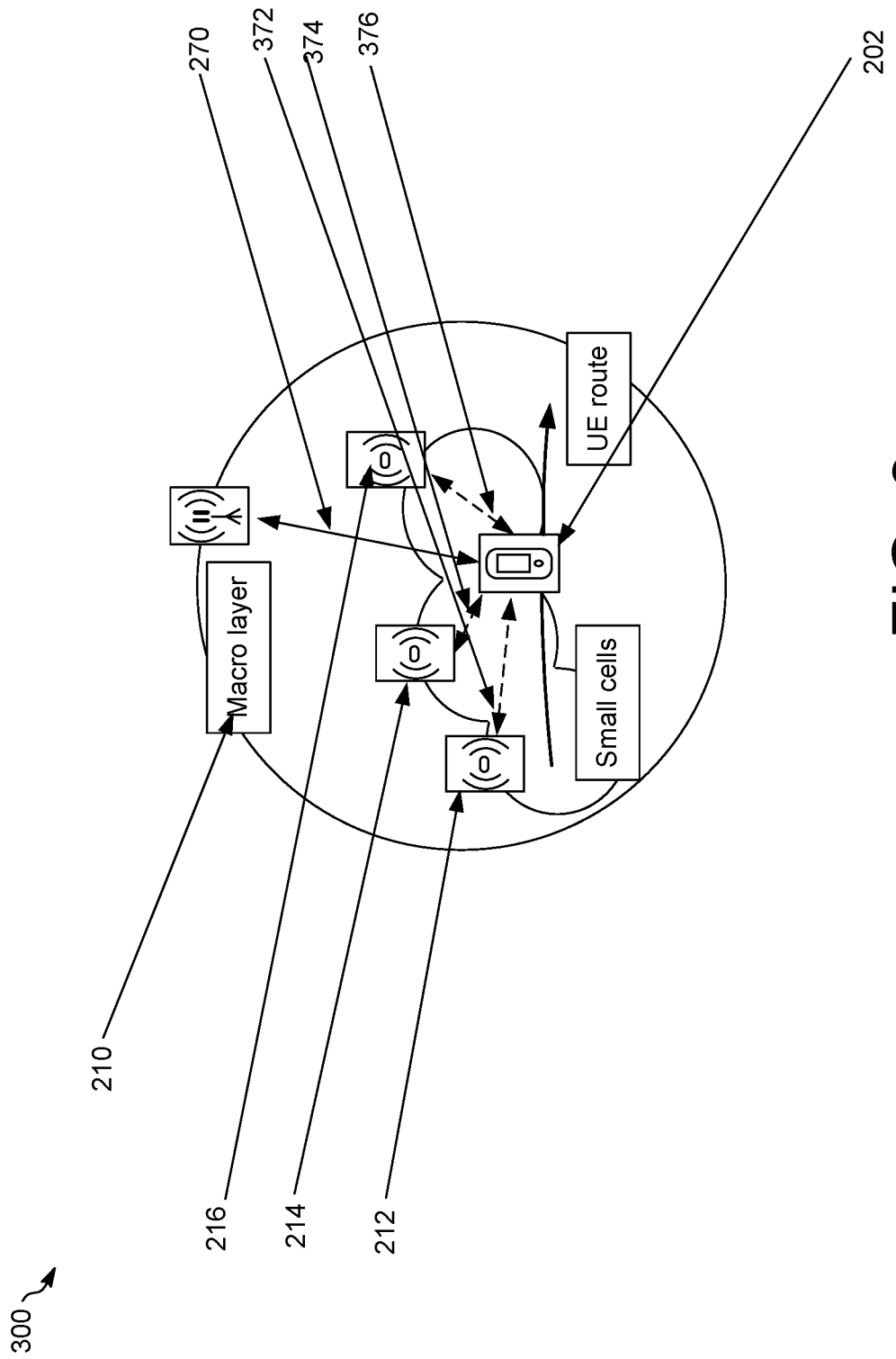
FIG. 3 illustrates an early data transmission (EDT) random access (RA) procedure for dual connectivity/carrier aggregation, according to at least an example implementation.

FIG. 3 illustrates an early data transmission (EDT) random access (RA) procedure for dual connectivity/carrier aggregation 300, according to at least an example implementation.

In an example implementation, the network (e.g., macro cell 21) may blindly configure UE 202 with multiple cells, e.g., cells 212, 214, 216, etc. (cells 212, 214, and/or 216 may be any type of cell, e.g., macro cell, small cell, pico cell, etc., or any combination thereof) instead of relying on inter-frequency measurements. UE 202 may then directly access the configured cells using early data transmission (EDT) by performing random access procedure (RA) to the cells and piggybacking user data within the random access procedure.

In some implementations, for example, the cells configured by network for the UE may be small cells, but it should be noted that small cell is just an example to describe the example implementations. The configured cells may be any type of cell that may be potential candidate secondary cells (SCells) for the UE. In another example, these cells may be interpreted as cells that the UE could use for aggregation or multi-connectivity (e.g., CA, DC, or multi-connectivity candidate cells for the UE).

In some implementations, for example, UE 202 may receive configuration information from macro cell 210 (shown by 270). But, UE 202 does not perform measurements to determine the best small cell from the one or more small cells to be added as a preferred secondary cell. In other words, UE 202 does not perform measurements to determine which small cell is the best/preferred cell for configuring as a secondary cell (SCell). Instead, UE 202 may initiate an early data transmission (EDT) random access (RA) procedure for dual connectivity/carrier aggregation (also referred to as EDT RA procedure for DCCA) with one or more cells indicated in the configuration information (for example, connections initiated with one or more small cells shown as 372, 374, and 376). Upon successful completion of the EDT RA procedure for DCCA with a cell indicated in the configuration information, UE 202 may connect (e.g., offload to) to that cell as a secondary cell.

In some implementations, for example, configuration information received from macro cell 210 may indicate the order (or priority) of the cells (e.g., which may be configured as secondary cells for DC/CA) with which UE 202 may initiate EDT RA procedure for DCCA. For example, UE 202 may initiate EDT RA procedure with the small cells sequentially or in an order configured by the network, or the order may be based on implementation at the UE. In one more example, some parallel processing may be possible if the small cells are in different carriers. If the EDT RA procedure for DCCA is not successful with one small cell, UE 202 may continue to initiate EDT RA procedure for DCCA with other small cells indicated in the configuration information received from macro cell 210. In some implementations, UE 202 may continue to initiate EDT RA procedure for DCCA with other small cells indicated in the configuration even if the EDT RA procedure for DCCA was successful earlier with another small cell so that UE 202 can determine if it can find a better small cell (e.g., best cell) for DCCA. In an example implementation, the initiation of EDT RA procedure for DCCA may be based on configuration information received from macro cell 210 and/or configuration information at the UE 202.

In an example implementation, depending on the success and quality of the EDT transmissions, the network configured small cells (e.g., small cells blindly configured by the network) may be dropped from an initial set of the small cell during the process. The dropping of one or more small cells may be performed by the UE, for example, if there is no response to the EDT, as this may likely indicate means that either that particular small cell is not within range and/or experiencing high load. In another example implementation, the dropping of one or more small cells may be performed done by the network, e.g., in case UE's signal is very weak. This may be based on the small cell not responding (e.g., not sending Msg4/MsgB) or by sending an explicit reject message (e.g., in Msg4 or MsgB, depending on the type of random access procedure).

In one example implementation, once a suitable small cell is found, the UE may continue based on the network indicating that a suitable small cell is found (e.g., in Msg4 or MsgB) or by the UE initiating another random access without using EDT and the remaining candidate small cells on the same carrier may be dropped.

In one example implementation, the data packets may be of any size and therefore the present disclosure proposes starting the process of identifying the best fitting small cell (e.g., most suitable cell for UE-SC connectivity) in parallel to EDT transmission. The process (e.g., parallel process) may then include first transmission to a plurality of small cells and gradually down-select to the best fitting small cell.

The above described procedure(s) save time and resources (e.g., measurement resources and/or occasions). In some implementations, for example, depending on the time needed to setup (e.g., connect to) the best fitting UE-SCell connection (e.g., time for frequency measurements), the UE may stay in an EDT like communication mode for more than the duration of transmitting the first data packet. This may be useful in scenarios with strict latency or reliability requirements.

Figure 4:
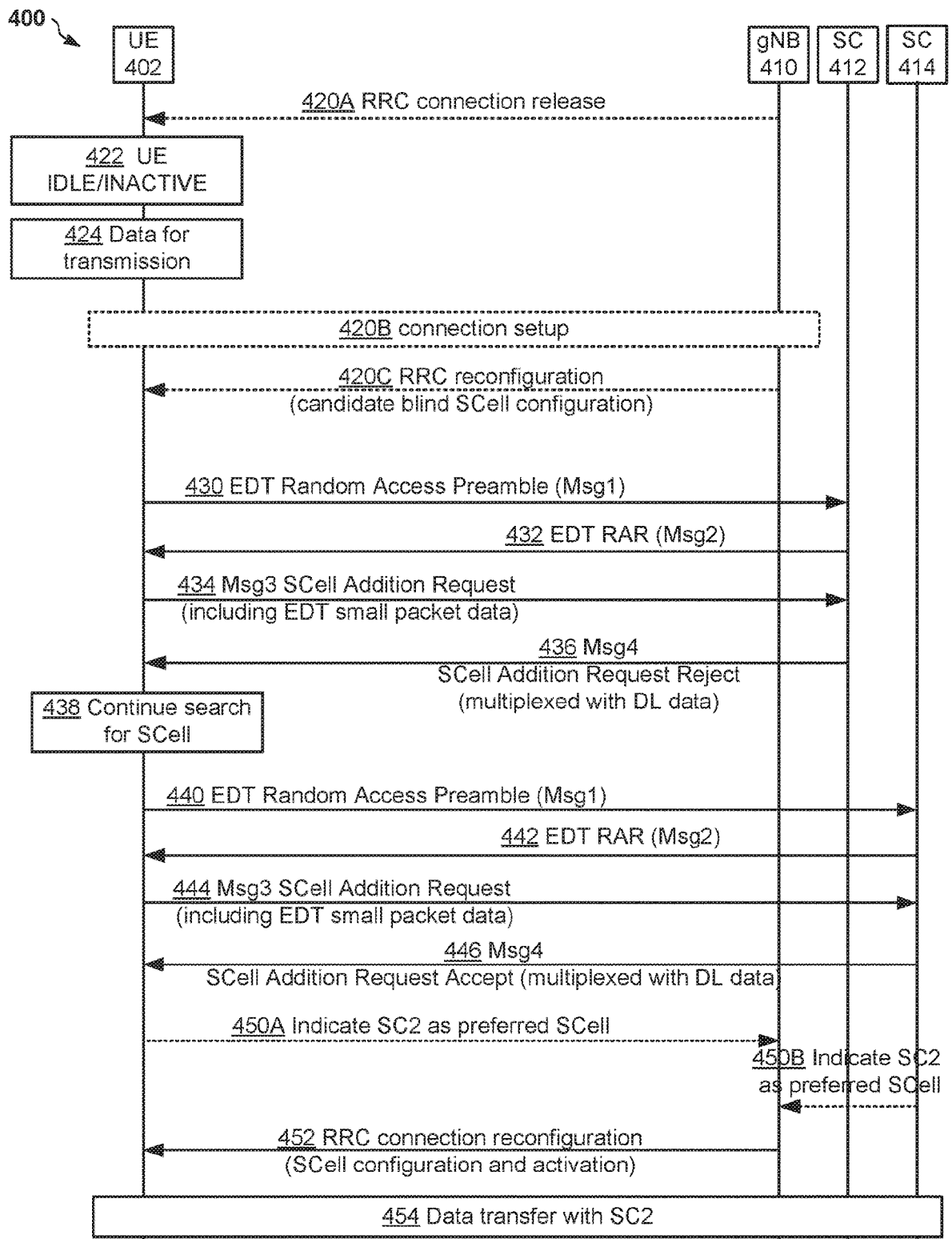
FIG. 4 is a message flow diagram illustrating early data transmission (EDT) random access (RA) procedure for dual connectivity/carrier aggregation, according to an example implementation.

FIG. 4 is a message flow diagram 400 illustrating early data transmission (EDT) random access (RA) procedure for dual connectivity/carrier aggregation, according to an example implementation.

In some implementations, for example, FIG. 4 may include a UE 402, a network node, e.g., eNB/gNB 410, and one or more other network nodes, e.g., small cells (SCs) 412 and/or 414. In the present disclosure, UE 402 may be or may not be located in the coverage area of SCs 412 and/or 414. In some implementations, SCs 412 and 414 may be used for offloading traffic from macro cell 410, if, for example, the UE determines that the UE is located within a coverage area of the SC and that the SC is the preferred/best secondary cell. Although only two SCs are illustrated in FIG. 4, the disclosure is not limited to two SCs and applies to more than two SCs as well.

UE 402 may receive configuration information from gNB, e.g., gNB 410. The configuration information indicates a listing (e.g., a list) of small cells which may be configured as secondary cells for DC/CA communications. UE 402 may receive the configuration information from gNB 410 in various ways. In one example implementation, UE 402 may receive configuration information via a radio resource control (RRC) connection release message from gNB 410, as shown at 420A. In one more example implementation, UE 402 may receive configuration information via system information (SI) or on-demand system information (SI) that may be broadcasted by gNB 410. In one more example implementation, UE 402 may receive configuration information via a RRC connection setup message, as shown at 420B. In one more example implementation, UE 402 may receive configuration information via a RRC reconfiguration message, as shown at 420C.

The configuration information received from gNB 410 may, in some implementations, indicate small cells with which the UE may initiate an EDT RA procedure for configuring DC/CA. In an example implementation, the EDT RA procedure initiated by the UE may be a faster and/or more efficient procedure for configuration and/or activation (e.g., addition and/or activation) of small cells indicated in the configuration information as secondary cells (SCells) to support DCCA.

In an example implementation, UE 402 may initiate EDT RA procedure for DCCA with a SC based at least on the priority of the small cells indicated in the configuration information received from gNB 410. In one more example implementation, UE 402 may initiate EDT RA procedure for DCCA with a SC in a random manner. In one more example implementation, UE 402 may initiate the EDT RA procedure for DCCA with a SC based at least on one or more rules or criterion defined at the UE. In one more example implementation, UE 402 may initiate EDT RA procedure for DCCA with a plurality of SCs in parallel if the plurality of SCs are associated with different carriers (e.g., different carrier frequencies).

At 422, UE 402 may be in RRC_IDLE or RRC_INACTIVE state. In some implementations, for example, UE 402 may transition to RRC_IDLE or RRC_INACTIVE state based on the instructions received from gNB 410 in a RRC connection release message.

At 424, UE 402 may detect presence of data for transmission from the UE. In some implementations, for example, UE 402 may detect presence of data for transmission in a TX buffer at the UE. Since the UE is an RRC_IDLE or RRC_INACTIVE state, the UE may have to transition to RRC_CONNECTED state for transmitting the data.

In response to detecting the presence of data for transmission, UE 402 may initiate a RA procedure. In some implementations, for example, the RA procedure initiated by the UE may be an early data transmission (EDT) RA procedure for DCCA. Moreover, in some implementations, the EDT RA procedure for DCCA initiated by the UE may be based on a four-step RA procedure or a two-step RA procedure. In an example implementation, UE 402 may initiate the four-step or two-step RA procedures based at least on configuration by a network entity (e.g., MME, gNB, etc.).

In some implementations, for example, as shown in FIG. 4, UE 402 may initiate a four-step EDT RA procedure for DCCA, as described below in reference to 430, 432, 434, and 436. For example, UE 402 may initiate the four-step EDT RA procedure for DCCA with SCs 412 and/or 414 based at least on the configuration information received from gNB 410. In an example implementation, the configuration information may indicate SC 412 as higher priority (relative to SC 414). In such an example implementation, at 430, UE 402 may initiate EDT RA procedure for DCCA with SC 412 by sending Msg1 of EDT RA procedure for DCCA. In some implementations, Msg1 may include a random access preamble (e.g., a Zadoff-Chu sequence) that may be randomly selected based at least on configuration at the UE (and/or configuration by the network).

At 432, UE 402 may receive Msg2 from SC 412. In an example implementation, Msg2 may include EDT random access response (RAR) from SC 412. The RAR may include a cell-radio network temporary identifier (C-RNTI). The C-RNTI may be used for identifying RRC connection and scheduling dedicated to UE 402.

At 434, UE may transmit Msg3 of the EDT RA procedure for DCCA to SC 412. In some implementations, for example, UE 402 may transmit Msg3 of the EDT RA procedure for DCCA to SC 412. In addition, in some implementations, Msg3 may include a request from UE 402 to add SC 412 as a secondary cell for DCCA so that UE 402 may transmit/receive data to/from SC 412.

At 436, UE may receive Msg4 of EDT RA procedure for DCCA from SC 412. In an example implementation, Msg4 may indicate that SC 412 has rejected cell add request (sent at 434 above) from the UE. In some implementations, for example, the rejection may be indicated to UE 402 by an explicit indication from SC 412 rejecting the cell add request or UE 402 may not receive any response within the time allowed for receiving acceptance of the cell add request. For instance, in one example implementation, UE 402 may not receive any response if UE 402 is not located within the coverage area of SC 412.

In some implementations, in response to the cell add request being rejected by SC 412, UE 402, at 438, may continue to search for SCells and initiate an EDT RA procedure for DCCA with another SC as indicated in the configuration information received from gNB 410, e.g., SC 414.

In some implementations, at 440, UE 402 may initiate EDT RA procedure for DCCA with SC 414 by sending Msg1 of EDT RA procedure for DCCA (similar to the EDT RA procedure described above, but with a different SC). For example, in some implementations, Msg1 may include UE 402 transmitting a random access preamble to SC 414.

At 442, UE 402 may receive Msg2 from SC 414. In an example implementation, Msg2 may include EDT random access response (RAR) from SC 414. The RAR may include a cell-radio network temporary identifier (C-RNTI).

At 444, UE may transmit Msg3 of the EDT RA procedure for DCCA to SC 414. In some implementations, for example, UE 402 may transmit Msg3 of the EDT RA procedure for DCCA to SC 414. In addition, in some implementations, Msg3 may include a request from UE 402 to add SC 414 for DCCA so UE 402 may transmit/receive data to/from SC 414.

At 446, UE may receive Msg4 of EDT RA procedure for DCCA from SC 414. In some implementations, for example, UE 402 may receive a message from SC 414 indicating that SC 414 has accepted the cell add request (sent at 444 above) from the UE.

At 450A, in some implementations, upon acceptance of the cell add request by SC 414, UE 402 may indicate to gNB 410 that SC 414 is the preferred secondary cell. In some implementations, for example, at 450B, upon acceptance of the cell add request by SC 414, SC 414 may indicate to gNB 410 that SC 414 is the preferred cell (e.g., preferred secondary cell) for UE 410.

At 452, UE 402 may receive RRC connection reconfiguration message from gNB 410. In an example implementation, the RRC reconfiguration message may be used to add and/or activate SC 414.

A 454, UE 402 may initiate data transfer (e.g., transmit/receive) with SC 414.

In some implementations, if the configuration information received from gNB 410 indicates additional cells, e.g., SC 416, UE 402 may continue the search for the best secondary cell and perform a handover to SC 416 if the EDT RA procedure for DCCA is successful and the connection to SC 416 is better than the connection to SC 414 based on for example, signal measurements, link quality, throughput, load, etc.

Thus, the proposed disclosure describes an improved mechanism for EDT RA procedure for DCCA for expediting addition and/or activation of secondary cells for better performance and/or efficient use of resources.

Figure 5:
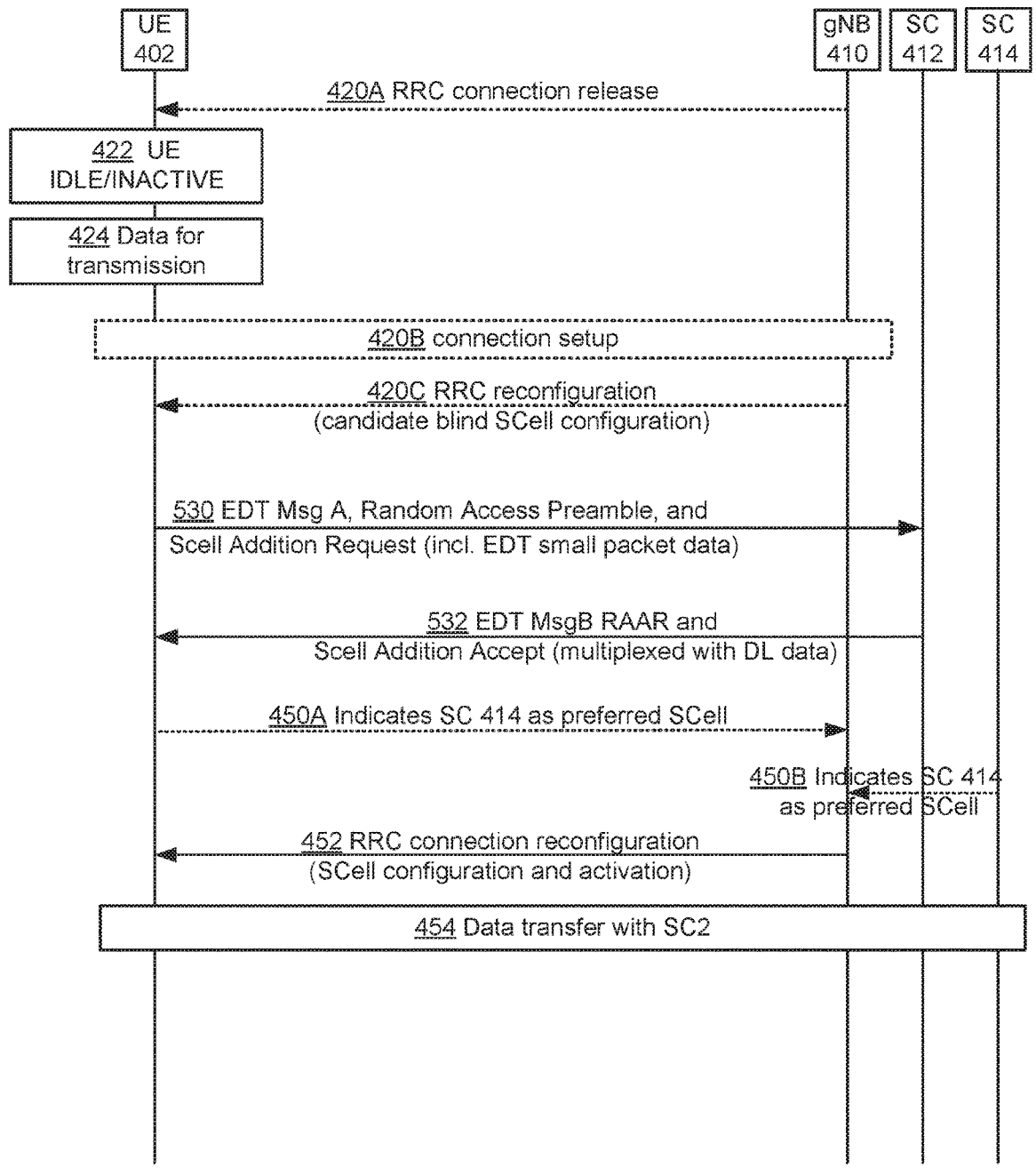
FIG. 5 is a message flow diagram illustrating early data transmission (EDT) random access (RA) procedure for dual connectivity/carrier aggregation, according to an additional example implementation.

FIG. 5 is a message flow diagram 500 illustrating early data transmission (EDT) random access (RA) procedure for dual connectivity/carrier aggregation, according to an additional example implementation.

The operations at 420A, 420B, 420C, 422, and 424 of FIG. 5 may be same or similar to operations 420A, 420B, 420C, 422, and 424 of FIG. 4.

In some implementations, for example, UE 402 may initiate a two-step EDT RA procedure for DCCA (instead of the four-step EDT RA procedure for DCCA as described above in reference to FIG. 4) with SC 414. In such an example implementation, Msg1 at 430 and Msg3 at 434 may be multiplexed as MsgA at 530 and Msg2 at 432 and Msg4 at 436 may be multiplexed as MsgB at 532.

In some implementations, for example, at 530, UE 402 may transmit EDT small packet data with MsgA to SC 414 and/or receive DL data with MsgB at 532. In an additional example implementation, at 530, UE 402 may not transmit any EDT small packet data with MsgA to SC 412 and/or may not receive any DL data with MsgB at 532. Instead, at 454, UE 402 may transmit/receive data once the addition of the SC 414 as secondary cell is complete.

Figure 6:
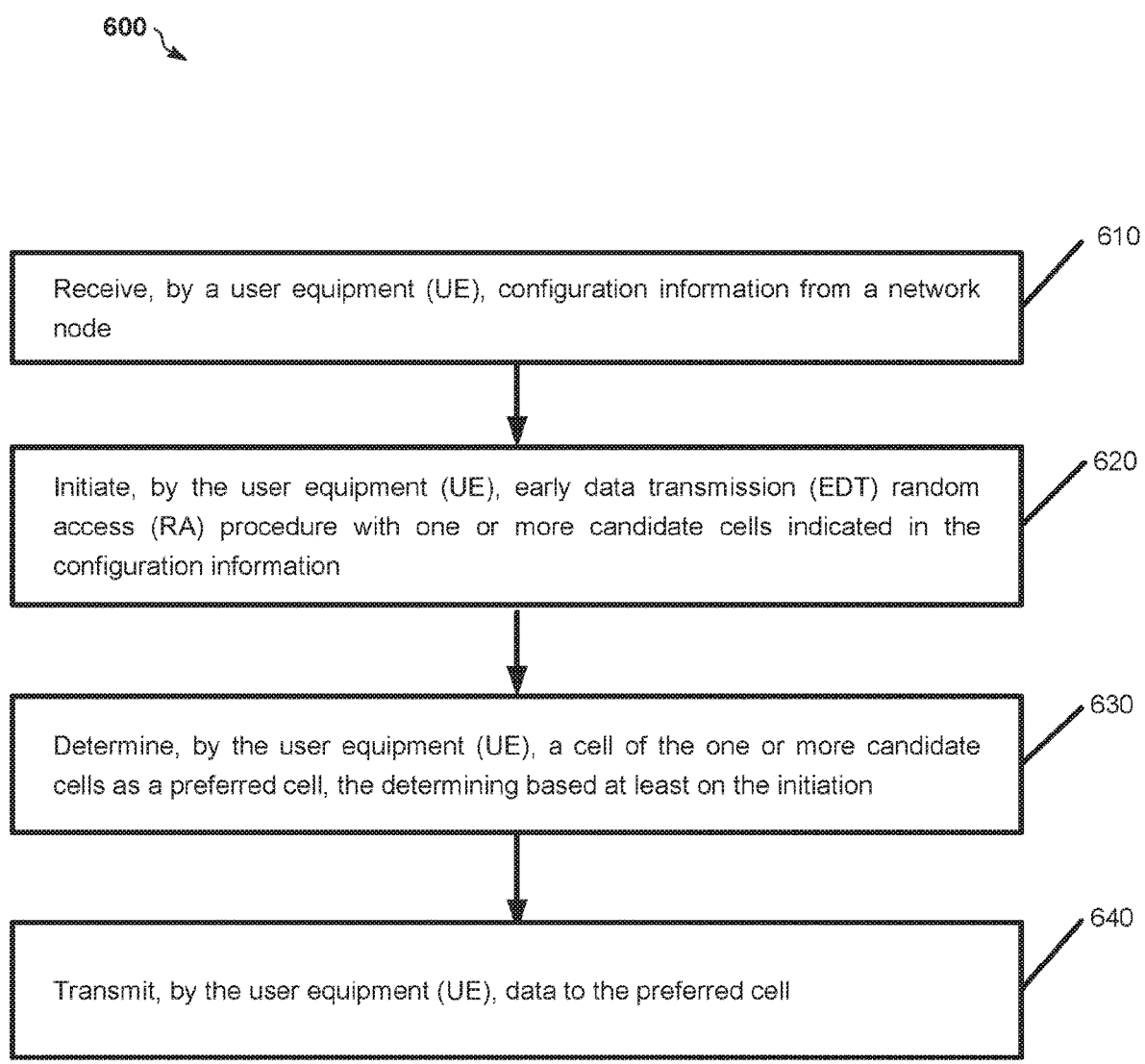
FIG. 6 is a flow chart illustrating early data transmission (EDT) random access (RA) procedure for dual connectivity/carrier aggregation, according to at least one example implementation.

FIG. 6 is a flow chart 600 illustrating EDT RA procedure for DCCA, according to at least one example implementation.

At block 610, a UE (e.g., UE 402) may receive configuration information from a network node. In an example implementation, UE 402 may receive configuration information from gNB 410. The configuration information, for example, may include a listing of cells the UE may use for configuring as secondary cells for DC/CA.

At block 620, the UE (e.g., UE 402) may initiate early data transmission (EDT) random access (RA) procedure for DCCA with one or more cells indicated in the configuration information. In an example implementation, UE 402 may initiate an EDT RA procedure for DCCA with SCs 412 and SC 414.

At block 630, the UE (e.g., UE 402) may determine a cell (e.g., SC 414) of the one or more cells (SCs 412 and 414) as a preferred secondary cell, the determining based at least on the initiation.

At block 640, the UE (e.g., UE 402) may transmit data to the preferred secondary cell, for example, SC 414.

Additional example implementations are described herein.

Example 1. A method of communications, comprising: receiving, by a user equipment (UE), configuration information from a network node; initiating, by the user equipment (UE), an early data transmission (EDT) random access (RA) procedure with one or more cells indicated in the configuration information, the one or more cells being potential secondary cells for dual connectivity or carrier aggregation at the user equipment (UE); determining, by the user equipment (UE), a cell of the one or more cells as a preferred secondary cell, the determining based at least on the initiating; and transmitting, by the user equipment (UE), data to the preferred secondary cell.

Example 2. The method of Example 1, wherein the initiating of the early data transmission (EDT) random access (RA) procedure includes: initiating a first early data transmission (EDT) random access (RA) procedure with a first cell of the one or more cells; transmitting, to the first cell, a first cell addition request, the first cell addition request being transmitted as part of Msg3 or MsgA of the first early data transmission (EDT) random access (RA) procedure; and receiving, from the first cell, acceptance of the first cell addition request, the acceptance received as part of Msg4 or MsgB of the first early data transmission (EDT) random access (RA) procedure.

Example 3. The method of any combination of Examples 1-2, wherein the initiating of the early data transmission (EDT) random access (RA) procedure includes: initiating a first early data transmission (EDT) random access (RA) procedure with a first cell of the one or more cells; transmitting, to the first cell, a first cell addition request, the first cell addition request being transmitted with Msg3 or MsgA of the first early data transmission (EDT) random access (RA) procedure; receiving, from the first cell, a rejection of the first cell addition request, the rejection received as part of Msg4 or MsgB of the first early data transmission (EDT) random access (RA) procedure; initiating a second early data transmission (EDT) random access (RA) procedure with a second cell of the one or more cells; transmitting, to the second cell, a second cell addition request, the second cell addition request being transmitted as part of Msg3 or MsgA of the second early data transmission (EDT) random access (RA) procedure; and receiving, from the second cell, acceptance of the second cell addition request, the acceptance received as part of Msg4 or MsgB of the second early data transmission (EDT) random access (RA) procedure.

Example 4. The method of any combination of Examples 1-3, further comprising: updating, by the user equipment (UE), the configuration information received from the network node by removing the first cell from the configuration information in response to the receiving of the rejection of the first cell addition request.

Example 5. The method of any combination of Examples 1-4, wherein the initiating of the early data transmission (EDT) random access (RA) procedure includes: initiating a first early data transmission (EDT) random access (RA) procedure with a first cell of the one or more cells; transmitting, to the first cell, a first cell addition request, the first cell addition request being transmitted with Msg3 or MsgA of the first early data transmission (EDT) random access (RA) procedure; receiving, from the first cell, acceptance of the first cell addition request, the acceptance received as part of Msg4 or MsgB of the first early data transmission (EDT) random access (RA) procedure; transmitting data packets to the first cell; initiating a second early data transmission (EDT) random access (RA) procedure with a second cell of the one or more cells; transmitting, to the second cell, a second cell addition request, the second cell addition request being transmitted as part of Msg3 or MsgA of the second early data transmission (EDT) random access (RA) procedure; receiving, from the second cell, acceptance of the second cell addition request, the acceptance received as part of Msg4 or MsgB of the second early data transmission (EDT) random access (RA) procedure; and performing a handover of the user equipment (UE) from the first cell to the second cell.

Example 6. The method of any combination of Examples 1-5, further comprising: transmitting, to the network node, an indication that the first cell is selected as the preferred secondary cell; or transmitting, to the network node, an indication that the second cell is selected as the preferred secondary cell.

Example 7. The method of any combination of Examples 1-6, wherein the Msg3 and Msg4 of the first and second early data transmission (EDT) random access (RA) procedures are associated with a four-step random access (RA) procedure; or wherein the MsgA and MsgB of the first and second early data transmission (EDT) random access (RA) procedures are associated with a two-step random access (RA) procedure.

Example 8. The method of any combination of Examples 1-7, wherein the configuration information is received by the user equipment (UE) when the user equipment (UE) is in a radio resource control (RRC) CONNECTED state.

Example 9. The method of any combination of Examples 1-8, wherein the configuration information is received by the user equipment (UE) when the user equipment (UE) is in a radio resource control (RRC_IDLE) or radio resource control (RRC)_INACTIVE state.

Example 10. The method of any combination of Examples 1-9, wherein the configuration information is received by the user equipment (UE) when the user equipment (UE) is in a radio resource control (RRC_IDLE) or radio resource control (RRC)_INACTIVE state via one or more of: system information (SI); on-demand system information (on-demand SI); and dedicated signaling.

Example 11. The method of any combination of Examples 1-10, wherein the dedicated signaling is via a radio resource control (RRC) connection release message.

Example 12. The method of any combination of Examples 1-11, wherein the configuration information indicates the one or more cells for configuring the user equipment (UE) with dual connectivity (DC) or carrier aggregation (CA).

Example 13. The method of any combination of Examples 1-12, where the one or more cells are indicated to the user equipment (UE), by the network node, without any inter-frequency measurements being performed by the user equipment (UE).

Example 14. The method of any combination of Examples 1-13, wherein the network node is a 5G base station (gNB) or an evolved NodeB (eNB).

Example 15. The method of any combination of Examples 1-14, comprising: receiving, by a user equipment (UE), configuration information from a network node; initiating, by the user equipment (UE), a random access (RA) procedure with one or more cells indicated in the configuration information, the one or more cells being potential secondary cells for dual connectivity or carrier aggregation at the user equipment (UE); determining, by the user equipment (UE), a cell of the one or more cells as a preferred secondary cell, the determining based at least on the initiating; and transmitting, by the user equipment (UE), data to the preferred secondary cell.

Example 16. The method of any combination of Examples 1-15, wherein the random access procedure is an early data transmission (EDT) random access procedure.

Example 17. The method of any combination of Examples 1-16, wherein the random access procedure is a four-step random access procedure.

Example 18. The method of any combination of Examples 1-17, wherein the one or more cells include a small cell, a macro cell, a pico cell, or a combination thereof.

Example 19. An apparatus comprising at least one processor and at least one memory including computer instructions, when executed by the at least one processor, cause the apparatus to perform a method of any combination of Examples 1-18.

Example 20. An apparatus comprising means for performing a method of any combination of Examples 1-18.

Example 21. A non-transitory computer-readable storage medium having stored thereon computer executable program code which, when executed on a computer system, causes the computer system to perform the steps of any combination of Examples 1-18.

Figure 7:
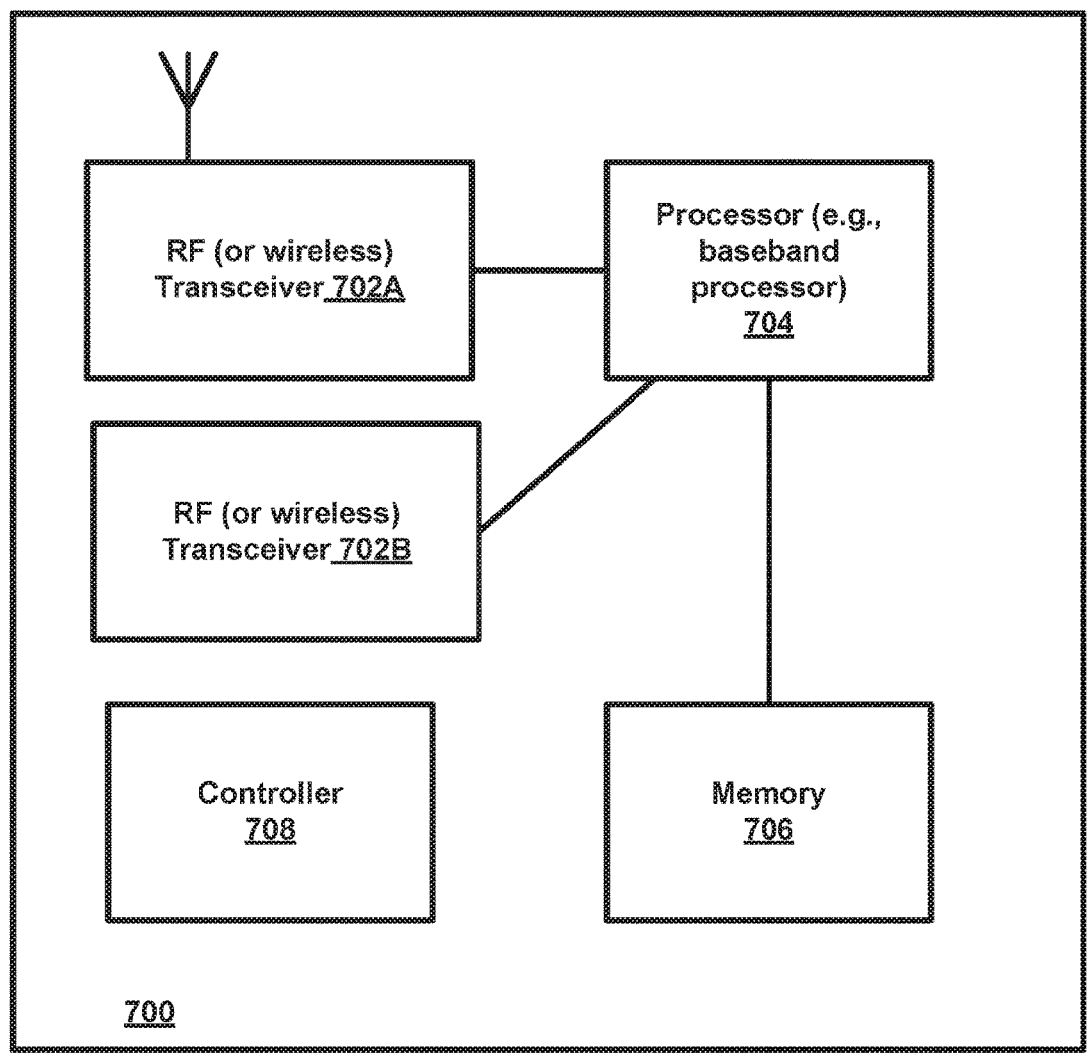
FIG. 7 is a block diagram of a node or wireless station (e.g., base station/access point or mobile station/user device/UE), according to an example implementation.

FIG. 7 is a block diagram 700 of a wireless station (e.g., user equipment (UE)/user device or AP/gNB/MgNB/SgNB) according to an example implementation. The wireless station 700 may include, for example, one or more RF (radio frequency) or wireless transceivers 702A, 702B, where each wireless transceiver includes a transmitter to transmit signals and a receiver to receive signals. The wireless station also includes a processor or control unit/entity (controller) 704/708 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software. Moreover, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. In one example implementation, a small cell may be a cell that operates with a low-power or operates at a higher frequency (for example higher than 6 GHz). In another example implementation, a small cell may be a cell that is used as a secondary cell for a UE (instead of a primary cell (PCell) or mobility anchor).

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method comprising:
    receiving, by a user equipment (UE), configuration information from a network node;
    initiating, by the UE, an early data transmission (EDT) random access (RA) procedure with one or more cells indicated in the configuration information, the one or more cells being potential secondary cells for dual connectivity or carrier aggregation at the UE, wherein the initiating comprises:
        initiating a first EDT RA procedure with a first cell of the one or more cells;
        transmitting, to the first cell, a first cell addition request, the first cell addition request being transmitted with Msg3 or MsgA of the first EDT RA procedure;
        receiving, from the first cell, acceptance of the first cell addition request, the acceptance received as part of Msg4 or MsgB of the first EDT RA procedure;
        transmitting data packets to the first cell;
        initiating a second EDT RA procedure with a second cell of the one or more cells;
        transmitting, to the second cell, a second cell addition request, the second cell addition request being transmitted as part of Msg3 or MsgA of the second EDT RA procedure;
        receiving, from the second cell, acceptance of the second cell addition request, the acceptance received as part of Msg4 or MsgB of the second EDT RA procedure; and
        performing a handover of the UE from the first cell to the second cell;
    determining, by the UE, the second cell of the one or more cells as a preferred secondary cell, the determining based at least on the initiating; and
    transmitting, by the UE, data to the preferred secondary cell.

2. The method of claim 1, further comprising: updating, by the UE, the configuration information received from the network node by removing the first cell from the configuration information in response to receiving of a rejection of the first cell addition request.

3. The method of claim 1, wherein the Msg3 and Msg4 of the first and second EDT RA procedures are associated with a four-step RA procedure.

4. The method of claim 1, wherein the configuration information is received by the UE when the UE is in a radio resource control (RRC)_CONNECTED state.

5. The method of claim 1, wherein the configuration information is received by the UE when the UE is in a radio resource control (RRC_IDLE) or radio resource control (RRC)_INACTIVE state.

6. The method of claim 1, wherein the configuration information is received by the UE when the UE is in a radio resource control (RRC_IDLE) or radio resource control (RRC)_INACTIVE state via the following: system information (SI); on-demand system information (on-demand SI); and dedicated signaling.

7. The method of claim 6, wherein the dedicated signaling is via a radio resource control (RRC) connection release message.

8. The method of claim 1, wherein the configuration information indicates the one or more cells for configuring the UE with dual connectivity (DC) or carrier aggregation (CA).

9. The method of claim 1, where the one or more cells are indicated to the UE, by the network node, without any inter-frequency measurements being performed by the UE.

10. The method of claim 1, wherein the network node is a 5G base station (gNB) or an evolved NodeB (eNB).

11. A user equipment comprising:
a processor; and
a memory comprising computer-executable instructions that, when executed by the processor, cause the processor to perform the following operations:
receiving configuration information from a network node;
initiating an early data transmission (EDT) random access (RA) procedure with one or more cells indicated in the configuration information, the one or more cells being potential secondary cells for dual connectivity or carrier aggregation at the user equipment (UE), wherein the initiating comprises:
initiating a first EDT RA procedure with a first cell of the one or more cells;
transmitting, to the first cell, a first cell addition request, the first cell addition request being transmitted with Msg3 or MsgA of the first EDT RA procedure;
receiving, from the first cell, acceptance of the first cell addition request, the acceptance received as part of Msg4 or MsgB of the first EDT RA procedure;
transmitting data packets to the first cell;
initiating a second EDT RA procedure with a second cell of the one or more cells;
transmitting, to the second cell, a second cell addition request, the second cell addition request being transmitted as part of Msg3 or MsgA of the second EDT RA procedure;
receiving, from the second cell, acceptance of the second cell addition request, the acceptance received as part of Msg4 or MsgB of the second EDT RA procedure; and
performing a handover from the first cell to the second cell;
determining the second cell of the one or more cells as a preferred secondary cell, the determining based at least on the initiating; and
transmitting data to the preferred secondary cell.

12. The user equipment according to claim 11, wherein the computer-executable instructions further cause the processor to update the configuration information received from the network node by removing the first cell from the configuration information in response to a receiving of a rejection of the first cell addition request.

13. The user equipment according to claim 11, wherein the Msg3 and Msg4 of the first and second EDT RA procedures are associated with a four-step RA procedure.

14. The user equipment according to claim 11, wherein the configuration information is received by the UE when the UE is in a radio resource control (RRC)_CONNECTED state.

15. The user equipment according to claim 11, wherein the configuration information is received by the UE when the UE is in a radio resource control (RRC_IDLE) or radio resource control (RRC)_INACTIVE state.

16. The user equipment according to claim 11, wherein the configuration information is received by the UE when the UE is in a radio resource control (RRC_IDLE) or radio resource control (RRC)_INACTIVE state via the following: system information (SI); on-demand system information (on-demand SI); and dedicated signaling.

17. The user equipment according to claim 16, wherein the dedicated signaling is via a radio resource control (RRC) connection release message.

18. The user equipment according to claim 11, wherein the configuration information indicates the one or more cells for configuring the UE with dual connectivity (DC) or carrier aggregation (CA).

19. The user equipment according to claim 11, where the one or more cells are indicated to the UE, by the network node, without any inter-frequency measurements being performed by the UE.

20. A system comprising:
a user equipment (UE);
a processor; and
a memory comprising computer-executable instructions that, when executed by the processor, cause the processor to perform the following operations:
receiving configuration information from a network node;
initiating an early data transmission (EDT) random access (RA) procedure with one or more cells indicated in the configuration information, the one or more cells being potential secondary cells for dual connectivity or carrier aggregation at the UE, wherein the initiating comprises:
initiating a first EDT RA procedure with a first cell of the one or more cells;
transmitting, to the first cell, a first cell addition request, the first cell addition request being transmitted with Msg3 or MsgA of the first EDT RA procedure;
receiving, from the first cell, acceptance of the first cell addition request, the acceptance received as part of Msg4 or MsgB of the first EDT RA procedure;
transmitting data packets to the first cell;
initiating a second EDT RA procedure with a second cell of the one or more cells;
transmitting, to the second cell, a second cell addition request, the second cell addition request being transmitted as part of Msg3 or MsgA of the second EDT RA procedure;
receiving, from the second cell, acceptance of the second cell addition request, the acceptance received as part of Msg4 or MsgB of the second EDT RA procedure; and
performing a handover from the first cell to the second cell;
determining the second cell of the one or more cells as a preferred secondary cell, the determining based at least on the initiating; and
transmitting data to the preferred secondary cell.

* * * * *